United States Patent [19]
Uemura et al.

[11] Patent Number: 5,675,445
[45] Date of Patent: Oct. 7, 1997

[54] LENS BARREL HAVING OPTICAL SYSTEMS WHICH CAN BE INDIVIDUALLY INSTALLED IN CORRESPONDING LENS FRAMES AND METHOD OF INSTALLING THE OPTICAL SYSTEMS

[75] Inventors: Yukio Uemura, Musashino; Akira Katayama, Koganei; Yoshio Imura, Kawasaki, all of Japan

[73] Assignee: Nikon Corporation, Tokyo, Japan

[21] Appl. No.: 375,889

[22] Filed: Jan. 20, 1995

[30] Foreign Application Priority Data

Jan. 20, 1994 [JP] Japan ................. 6-018851

[51] Int. Cl.⁶ ............................. G02B 7/02; G02B 15/14
[52] U.S. Cl. ............................. 359/827; 359/703
[58] Field of Search .................. 359/827, 821, 359/703, 704

[56] References Cited

U.S. PATENT DOCUMENTS

| | | | |
|---|---|---|---|
| 3,765,748 | 10/1973 | Mito | 359/703 |
| 4,824,207 | 4/1989 | Kamata | 359/827 |
| 4,885,600 | 12/1989 | Iwasa | 354/400 |
| 5,018,832 | 5/1991 | Terunuma | 359/694 |
| 5,172,276 | 12/1992 | Ueyama et al. | 359/813 |
| 5,293,268 | 3/1994 | Ihara | 359/704 |

FOREIGN PATENT DOCUMENTS

| | | | |
|---|---|---|---|
| 135505 | 10/1979 | Japan | 359/827 |
| 3-110530 | 5/1991 | Japan | |
| 403105303 | 5/1991 | Japan | 359/827 |
| 404123012 | 4/1992 | Japan | 359/827 |
| 6-289454 | 10/1994 | Japan | |

*Primary Examiner*—Georgia Y. Epps
*Assistant Examiner*—Ricky Mack

[57] ABSTRACT

A lens apparatus, such as a lens barrel for a camera, allows different optical systems to be easily removed and installed. The lens apparatus has first and second optical systems with an optical axis of the lens apparatus extending thorough the first and second optical systems. First and second lens compartments respectively retain the first and second optical systems. First and second lens frames respectively correspond to, and respectively retain, the first and second lens compartments. The first and second lens compartments are independent structures from the first and second lens frames to allow the first and second lens compartments to be removed from, and inserted into, the respectively corresponding first and second lens frames. The present invention also relates to a method of assembling the lens apparatus. The method comprises (a) fixing a drive unit, which drives at least one of the first and second optical systems, to the base member; (b) fixing the first and second lens frames to the base member; and (c) respectively fixing the first and second lens compartments, respectively retaining the first and second optical systems, into the first and second lens frames after the drive unit and the first and second lens frames are fixed to the base member.

14 Claims, 11 Drawing Sheets

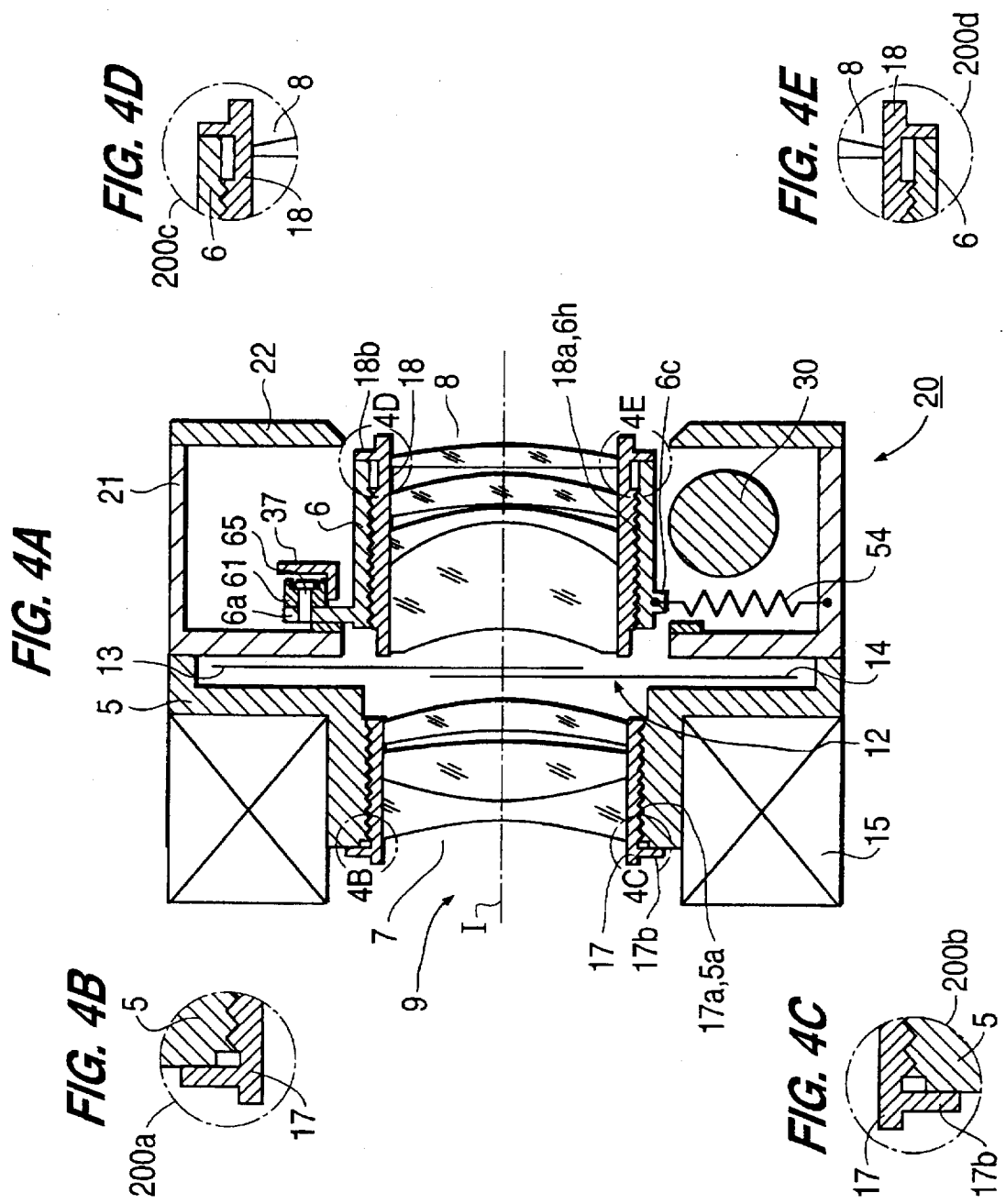

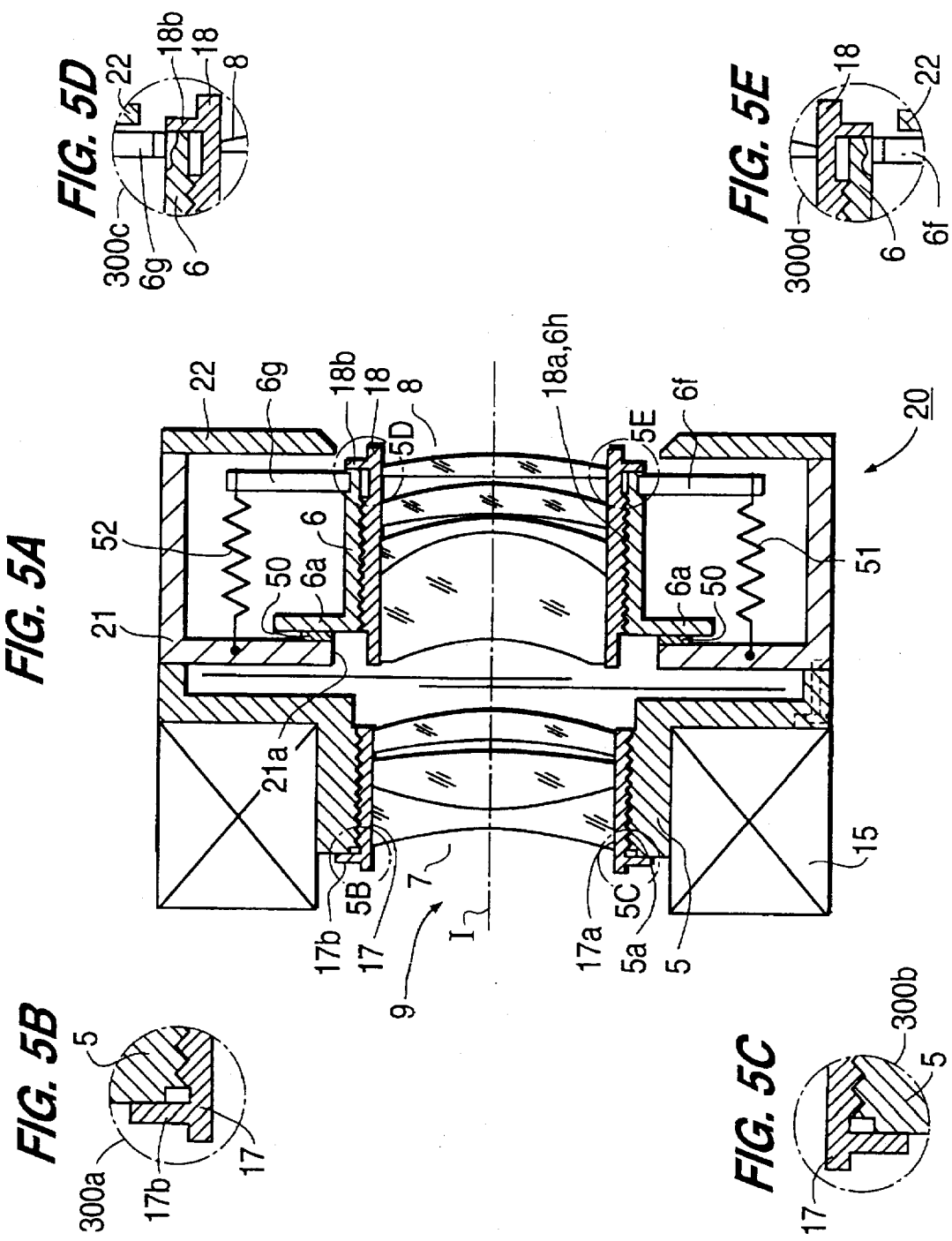

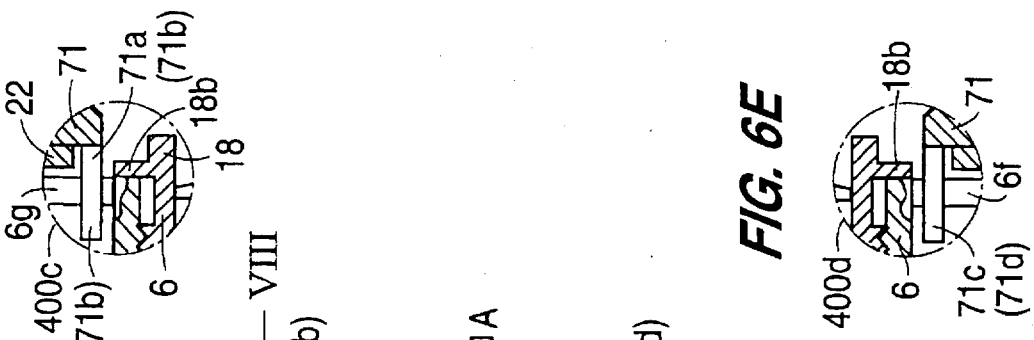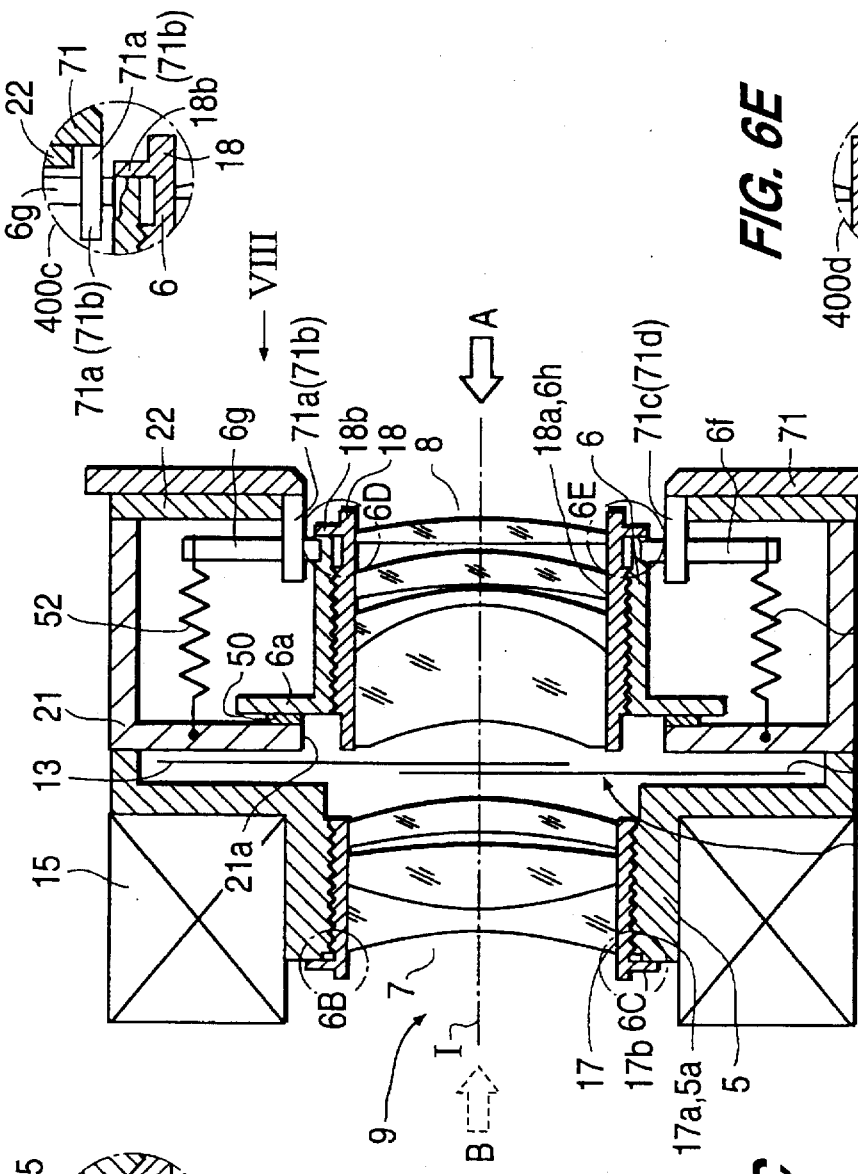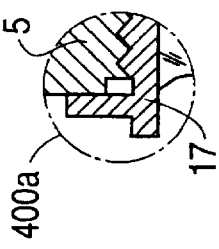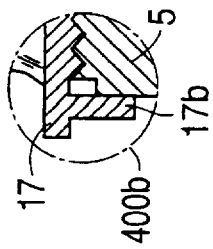

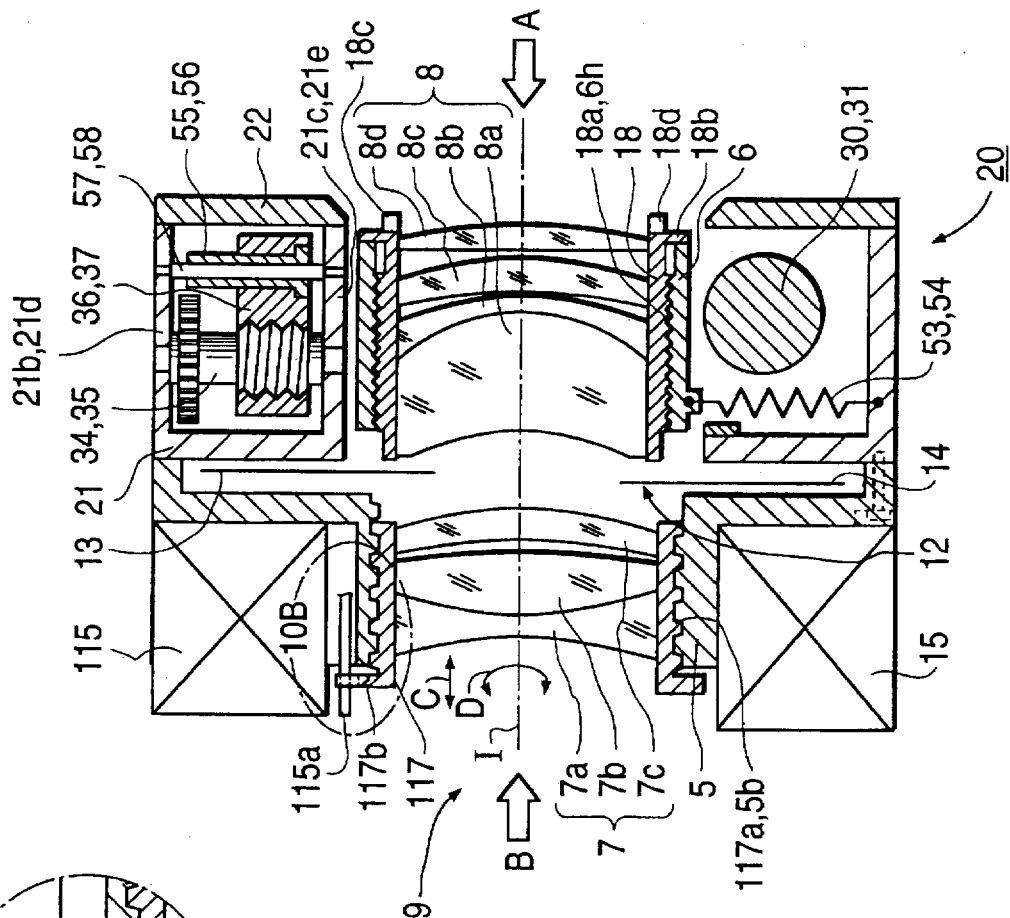
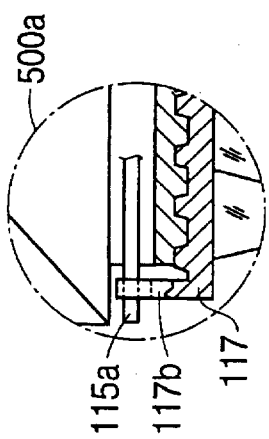
FIG. 10A
FIG. 10B

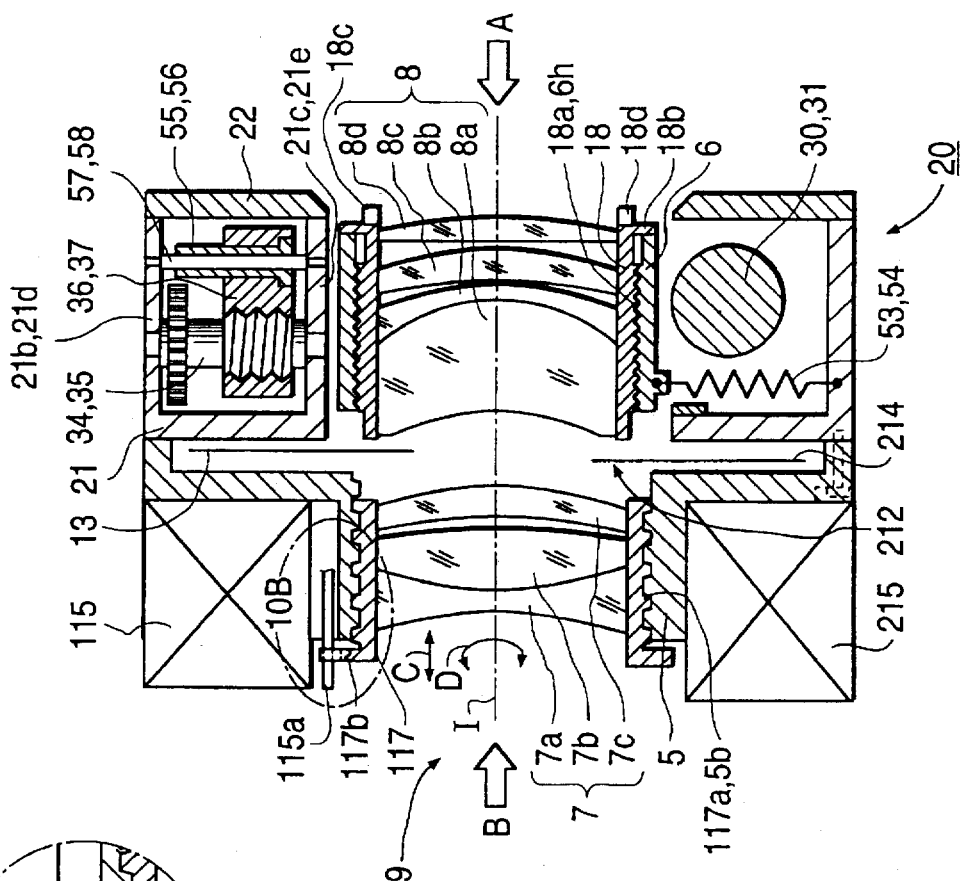
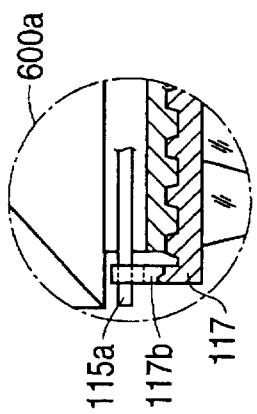
FIG. 11A
FIG. 11B

LENS BARREL HAVING OPTICAL SYSTEMS WHICH CAN BE INDIVIDUALLY INSTALLED IN CORRESPONDING LENS FRAMES AND METHOD OF INSTALLING THE OPTICAL SYSTEMS

BACKGROUND OF THE INVENTION

1. Field of the Invention

The present invention relates to a camera having a lens barrel equipped with a vibration compensation mechanism which reduces or eliminates photographic blurring caused by vibrations affecting the camera. More particularly, the present invention relates to the positioning and design of components within the lens barrel.

2. Description of the Related Art

A conventional camera can be equipped with a conventional vibration compensation mechanism to reduce or eliminate photographic blurring caused by vibrations affecting the camera. Such vibrations can occur, for example, from a trembling or shaking of a photographer's hand. Conventional vibration compensation mechanisms use a photographic lens system having multiple lens groups. One of the multiple lens groups contains a vibration preventing lens which is supported in the camera and is movable. The vibration preventing lens is shifted in a direction perpendicular to the optical axis to compensate for detected vibrations.

A camera having such a vibration compensation mechanism is disclosed in Japanese Laid-Open Patent Publication 3-110530. In this camera, a lens frame holds the vibration preventing lens and is retained in the camera so that the lens frame can be moved in a direction which is perpendicular to the optical axis. A drive unit drives the lens frame via a coupling unit to move the vibration preventing lens. Moreover, as proposed in Japanese Patent Application 4-32998 by the inventors of the present invention, image vibration is prevented by moving the vibration preventing lens in the appropriate direction via a suitable drive control in the X axis and Y axis directions. According to the invention as disclosed in Japanese Patent Application 4-32998, a drive unit uses electric motors, transmission gear mechanisms and screw mechanisms to drive the vibration preventing lens in the X axis direction and Y axis direction at right angles (perpendicular) to the optical axis of the main optical system. A lens compartment retains the vibration preventing lens. A lens frame retains the vibration preventing lens and the lens compartment with respect to a base member within the lens barrel.

However, in the above described vibration compensation mechanism, the lens compartment is integrally formed with a corresponding lens frame. Thus, the lens compartment is not detachable from the lens frame. The lens frame is movably supported by the drive mechanism and is attached to a base member. The vibration preventing lens is retained in the lens frame and only the vibration preventing lens is directly fixed in the lens frame. The lens frame is then shifted and moved in a direction at right angles to the optical axis by a drive unit attached to the base member. As a result of this construction, the vibration preventing lens cannot be easily removed or installed from the lens frame.

Moreover, in conventional vibration compensation mechanisms, a separate lens system is generally located adjacent to the vibration preventing lens. A respective lens frame retains this lens system and is fixed directly to the base member, or integrally to the base member. The base member also acts as a baseplate to which a drive unit is attached. When the camera is assembled, it is first necessary to assemble the vibration preventing lens and the lens system as individual units, and thereafter to fix and retain the assembled vibration preventing lens and the assembled lens system in respective, corresponding lens frames. After the vibration preventing lens is fixed to the corresponding lens frame, the image vibration preventing drive unit is assembled and attached to the base member. Thus, it is necessary to fix the vibration preventing lens and the lens system to the corresponding lens frames and attach the lens frames to a base member. This procedure can cause the installed vibration preventing lens to be soiled or damaged when the adjacent lens system is being installed. Also, the vibration preventing lens or the adjacent lens system can be easily soiled or damaged when the lens frames are attached to the base member.

Furthermore, other components, such as drive units, are attached to the base member after the vibration preventing lens and the lens system are attached to the base member. As a result, the vibration preventing lens or the lens system may be soiled or damaged when other components are attached to the base member. Thus, a high level of care and precision is required in the assembly process to avoid this type of soiling or damage to the vibration preventing lens or the lens system, thereby making the camera difficult and expensive to assemble.

As described above, the lens systems are assembled in respective, corresponding lens frames. These lens frames are "exclusive use" members since they are specially designed for a particular lens. As a result, additional "exclusive use" members are necessary to accommodate changes so that lens systems of different designs and specifications can be used in the camera. Thus, a change of lenses requires a change in lens frames. This lack of interchangeability increases camera cost. Specifically, different lens frame molds must be manufactured for each change in the lens design or specifications. Moreover, it is necessary to fix and position the assembled lens systems in predetermined positions with respect to a base member. This procedures requires a great amount of care. In particular, the assembled vibration preventing lens and an assembled, adjacent lens system must be retained in predetermined positions without play, while being properly positioned to coincide with the optical axis of a main optical system.

Moreover, as discussed above, the lens frame holding the vibration preventing lens is supported to be movable by an image vibration preventing drive unit located and assembled on the base member. The assembled state and position of the drive mechanism are also important from the aspect of accuracy of the photographic lens system. However, it is difficult to fix and position the drive mechanism without damaging the installed vibration preventing lens or other installed lens system in the camera.

SUMMARY OF THE INVENTION

It is therefore an object of the present invention to provide a camera which allows for the installation of various lens systems while minimizing the possibility of soiling or damaging the lens systems.

It is a further object of the present invention to provide a camera in which drive units and other components are first attached to a base member and, thereafter, a vibration preventing lens and a different, adjacent optical system are installed.

It is an additional object of the present invention to provide a camera which minimizes soiling and damage to lens systems caused by the installation of drive units and other components, by installing the drive units and other components before installing the various lens systems.

It is an additional object of the present invention to provide a camera having base members, drive units and lens frames which are interchangeably operable with different lens systems, thereby allowing lens systems having different lenses, different focal lengths, different open aperture F numbers and different specifications to be easily installed in the camera without requiring the base members, drive units and/or lens frames to be changed.

It is a further object of the present invention to provide a camera which allows for easy and inexpensive positioning and centering at the time of installation of the various lens systems in the camera.

Objects of the present invention are achieved by providing a lens apparatus comprising first and second optical systems, an optical axis of the lens apparatus extending thorough the first and second optical systems; first and second lens compartments which respectively retain the first and second optical systems; and first and second lens frames which respectively correspond to, and respectively retain, the first and second lens compartments. The first and second lens compartments are independent structures from the first and second lens frames to allow the first and second lens compartments to be removed from, and inserted into, the respectively corresponding first and second lens frames.

Objects of the present invention are also achieved by the lens apparatus including a drive unit which drives at least one of the first and second optical systems to change the positioning of the driven optical system along the optical axis; and a base member which supports the first and second lens frames and the drive unit.

Moreover, objects of the present invention are achieved by providing a method of assembling a lens apparatus. The lens apparatus includes first and second optical systems, first and second lens compartments which respectively retain the first and second optical systems, first and second lens frames which respectively correspond to, and respectively retain, the first and second lens compartments, a drive unit which moves at least one of the first and second optical systems to change the position of the at least one first and second optical systems, and a base member. The method comprises (a) fixing the drive unit to the base member; (b) fixing the first and second lens frames to the base member; and (c) respectively fixing the first and second lens compartments, respectively retaining the first and second optical systems, into the first and second lens frames after the drive unit and the first and second lens frames are fixed to the base member.

BRIEF DESCRIPTION OF THE DRAWINGS

These and other objects and advantages of the invention will become apparent and more readily appreciated from the following description of the preferred embodiments, taken in conjunction with the accompanying drawings, of which:

FIG. 4A is a cross section of an optical system along the line IV—IV of FIG. 3, according to an embodiment of the present invention.

FIGS. 4B, 4C, 4D and 4E are diagrams illustrating portions of the optical system illustrated in FIG. 4A, according to an embodiment of the present invention.

FIG. 5A is a cross section of an optical system along the line V—V of FIG. 3, according to an embodiment of the present invention.

FIGS. 5B, 5C, 5D and 5E are diagrams illustrating portions of the optical system illustrated in FIG. 5A, according to an embodiment of the present invention.

FIG. 6A is a diagram illustrating a jig for use at the time of insertion of the optical system in FIG. 5A, according to an embodiment of the present invention.

FIGS. 6B, 6C, 6D and 6E are diagrams illustrating portions of an optical system used with the jig illustrated in FIG. 6A, according to an embodiment of the present invention.

FIG. 10A is a sectional diagram showing a lens barrel of a camera, according to an embodiment of the present invention.

FIG. 10B is a diagram illustrating a portion of the lens barrel illustrated in FIG. 10A, according to an embodiment of the present invention FIG. 11A is a sectional diagram showing a lens barrel of a camera, according to an embodiment of the present invention.

FIG. 11B is a diagram illustrating a portion of the lens barrel illustrated in FIG. 11A, according to an embodiment of the present invention

DESCRIPTION OF THE PREFERRED EMBODIMENTS

Figure 1:
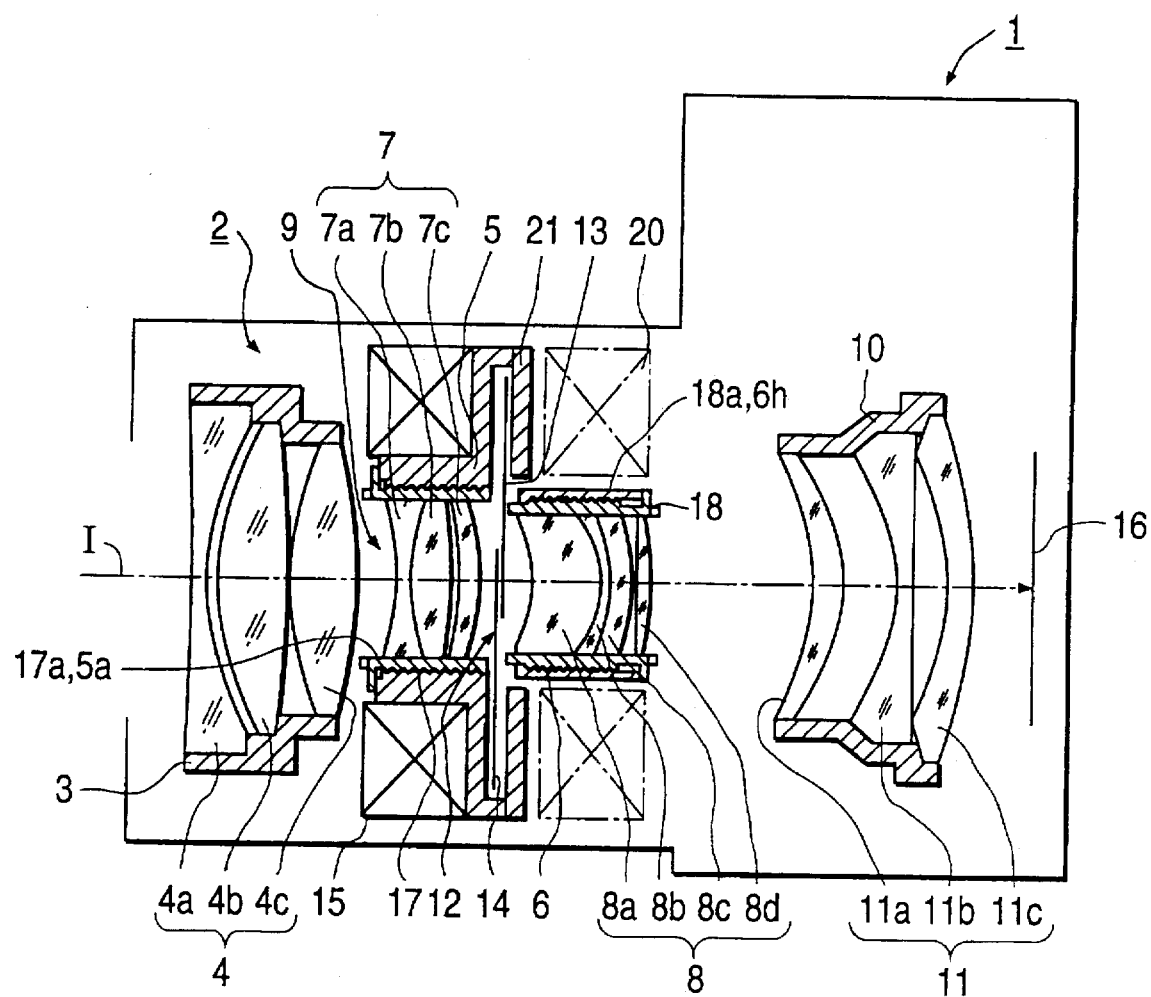
FIG. 1 is a diagram of a camera having a lens barrel, according to an embodiment of the present invention.

Reference now made to the figures, wherein like reference numerals represent similar structures or processes throughout the drawings, and more particularly to FIGS. 1–8, which illustrate a vibration preventing device arranged as an attachment in a lens barrel of a camera, according to an embodiment of the present invention. As illustrated in FIG. 1, a camera body 1 has an attached photographic lens system 2. Photographic lens system 2 is a zoom lens having a vibration preventing function and is the principal optical system of the camera. Photographic lens system 2 has an optical axis I and comprises a first lens group 4, a second lens group 9 and a third lens group 11. Second lens group 9 comprises a front lens group 7 and a rear lens group 8 (interchangeably referred to herein as "vibration preventing lens 8"). First lens group 4 comprises lenses 4a, 4b and 4c, retained in a lens frame 3. Second lens group 9 comprises a first group of lenses 7a, 7b and 7c, and a second group of lenses 8a, 8b, 8c and 8d. The first group of lenses 7a, 7b and 7c and the second group of lenses 8a, 8b, 8c and 8d are held in lens compartments 17 and 18, respectively. Lens compartment members 17 and 18 are retained in lens frames 5 and 6, respectively. Third lens group 11 comprises lenses 11a, 11b and 11c, retained in a lens frame 10.

A lens shutter 12 is interposed between front lens group 7 and rear lens group 8 and comprises shutter blinds 13 and 14 and a shutter drive unit 15. Moreover, a stop (not illustrated) can be positioned between front lens group 7 and rear lens group 8. Shutter drive unit 15 drives shutter blinds 13 and 14. Shutter drive unit 15 is located in the exterior circumferential portions of a lens frame 5, which is a fixed side member of the front lens group 7 in the second lens group 9. Moreover, shutter blinds 13 and 14 are bordering on the front side of rear lens group 8, which functions as an image vibration preventing lens.

A subject is imaged in a conventional manner on an imaging plane 16 of film by first lens group 4, second lens group 9 and third lens group 11 of photographic lens system 2. Rear lens group 8 of second lens group 9 is a conventional image vibration preventing lens. Thus, rear lens group 8 is movable and can be shifting in a direction at right angles to the optical axis I using a drive unit 20. Drive unit 20 is fixed to a baseplate 21 and used baseplate 21 as a base member. A male screw portion 18a is disposed on the external circumference of lens compartment 18 by being threaded into a female screw portion 6h disposed in the internal circumference of a lens frame 6, thereby integrally connecting lens compartment 18 of the second lens group 9 and lens frame 6. A male screw portion 17a is disposed on the external circumference of lens compartment 17 by being threaded into a female screw portion 5a disposed in the internal circumference of lens frame 5. Rear lens group 8 moves according to vibrations affecting an image in imaging plane 16. Drive unit 20 uses baseplate 21 as a base member on the lens shutter side of baseplate 21 on an external circumference of rear lens group 8. Lens frame 5 can be referred to as a "front" lens frame of second lens group 9, and lens frame 6 can be referred to as a "rear" lens frame of second lens group 9.

FIGS. 2, 3, 4A, 4B, 4C, 4D, 4E, 5A, 5B, 5C, 5D and 5E also illustrate details of drive unit 20. As shown in FIGS. 5A, 5B, 5C, 5D and 5E, rear lens group 8 (also referred to as "vibration preventing lens 8") is retained in lens compartment 18. Male screw portion 18a is disposed on the external circumference of lens compartment 18 by being threaded into female screw portion 6h disposed in the internal circumference of lens frame 6, thereby integrally connecting lens compartment 18 of the second lens group 9 and lens frame 6. A flange portion 18b is disposed on the rear end of lens compartment 18. Flange portion 18b contacts with a portion of lens frame 6 to allow position setting in the optical axis direction of vibration preventing lens 8. If necessary, shim adjustment and similar adjustments can be made possible by attaching a suitable position setting mechanism. In this manner, position setting can be performed with uniformity.

Front lens group 7 is adjacent to vibration preventing lens 8 on the optical axis and is retained in lens compartment 17. Male screw portion 17a is disposed on the external circumference of lens compartment 17 by being threaded into a female screw portion 5a disposed in the internal circumference of lens frame 5. Lens frame 5 is integrally fixed by screws to the baseplate 21. Baseplate 21 is a base member located adjacent to drive unit 20 such that it integrally connects, on insertion, both lens compartment 17 and lens frame 5. Furthermore, a flange portion 17b is disposed on the front end portion of lens compartment 17. Flange portion 17b contacts with a portion of lens frame 5 to make position setting possible in the optical axis direction of front lens group 7. In the present embodiment of the present invention, lens frame 5 is fixed by screws to the baseplate 21. Baseplate 21 acts as a base member.

As illustrated in FIG. 1, lens shutter 12 divides baseplate 21 into a first side and a second side. Drive unit 20 is supported on the first side of baseplate 21 and shutter drive unit 15 for driving lens shutter 12 is supported on the second side of baseplate 21. A stop can also be supported on the second side of baseplate 21.

Figure 2:
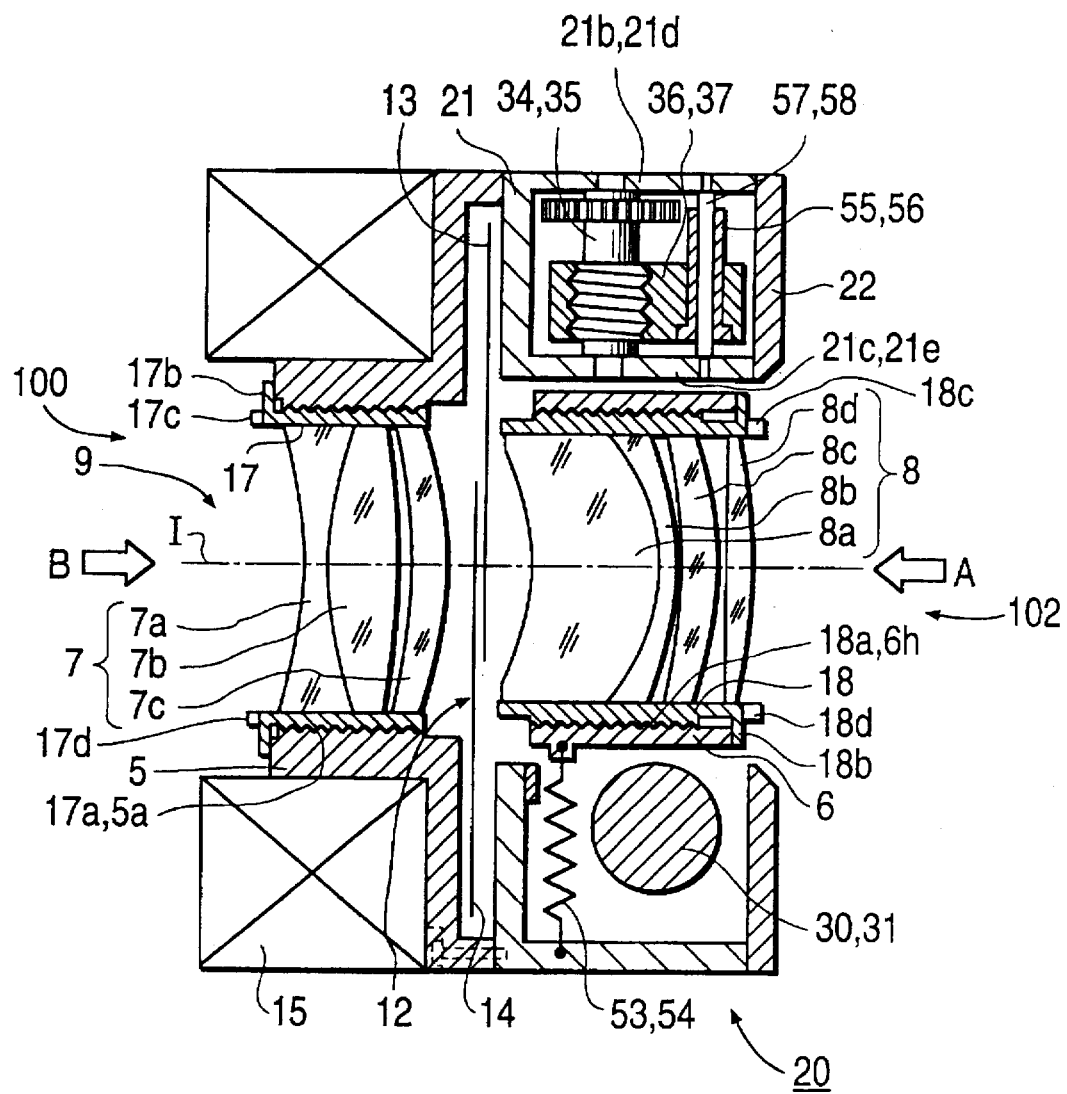
FIG. 2 is a cross section of a lens barrel of a camera according to an embodiment of the present invention.
Figure 3:
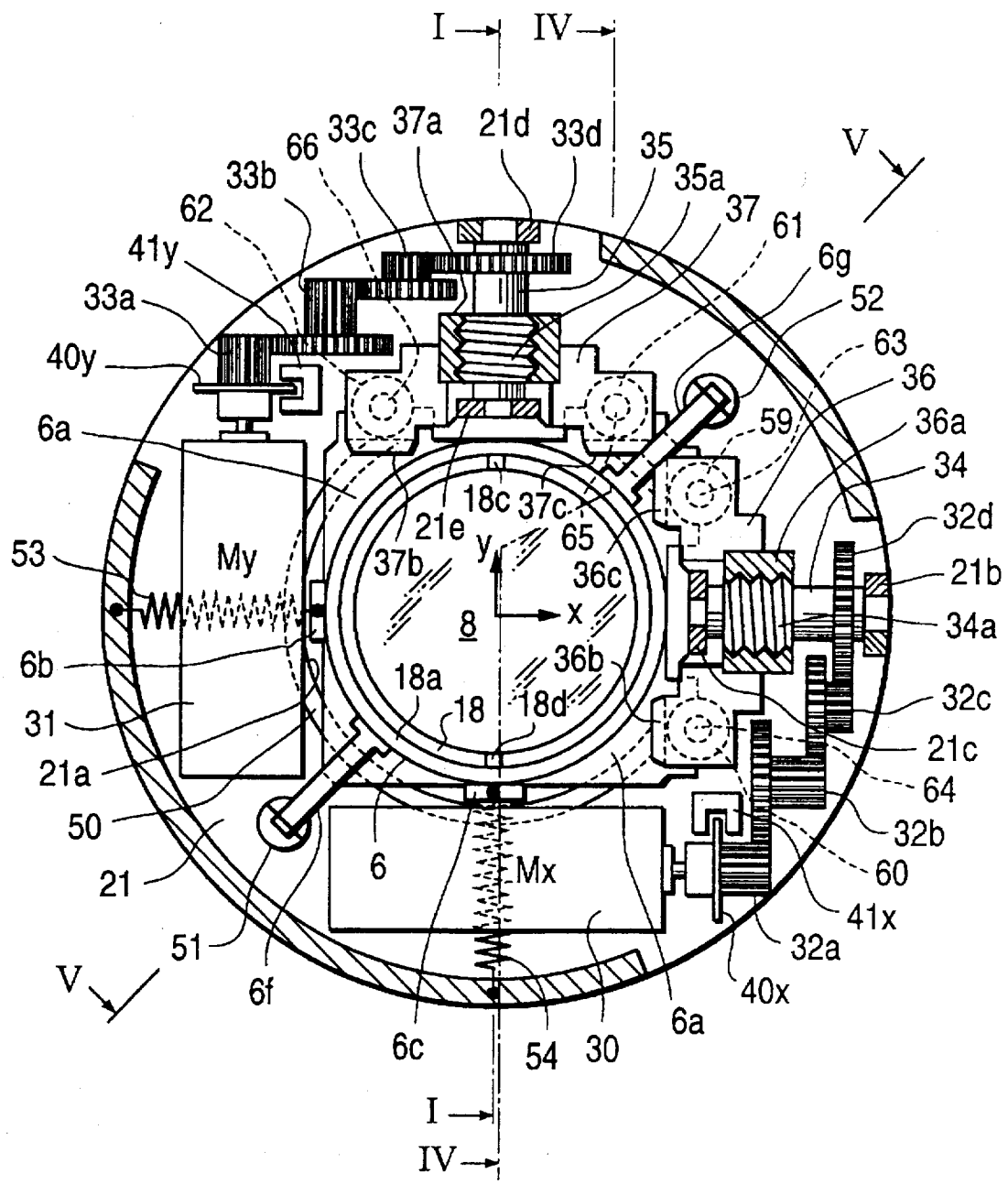
FIG. 3 is a cross section of a vibration preventing mechanism in a lens barrel of a camera, according to an embodiment of the present invention.

As shown in FIGS. 2 and 3, slotted portions 17c and 17d are disposed in lens compartment 17, and slotted portions 18c and 18d are disposed in lens compartment 18. Slotted portions 17c, 17d, 18c and 18d allow threaded insertion into lens frames 5 and 6 to be easily performed. Accordingly, it is possible to insert lens compartments 18 and 17 assembled at the rear of baseplate 21 and lens frame 5, respectively. Thus, lens compartment 18 and lens frame 6 together form an independent structure. Moreover, lens compartment 17 and lens frame 5 together form an independent structure. As a result, drive unit 20 and lens shutter 12 comprise separate independent structures which can cooperate with each other.

Lens compartments 17 and 18 are inserted into lens frames 5 and 6, respectively. In this manner, lens frames 5 and 6 are installed before the installation of vibration preventing lens 8 and front lens group 7. As a result, vibration preventing lens 8 and front lens group 7 are not soiled or damaged by the installation of lens frames 5 and 6. Furthermore, the insertion of drive unit 20 into baseplate 21 can be easily performed. Moreover, when changes arise in the design or in the specification of the optical lens system, these changes can be performed by changing front lens group 7 and rear lens group 8 and the corresponding lens compartments 17 and 18, without changing lens frames 5 or 6. Drive unit 20 and lens frames 5 and 6 are attached to baseplate 21 and are operable with different lenses of various focal lengths and aperture F numbers. Thus, changes in lens design or specifications can be performed by simply changing lenses without changing drive unit 20 and/or lens frames 5 and 6. In other words, baseplate 21, drive unit 20 and lens frames 5 and 6 can be used with different lenses. Thus, it is possible to install different lens systems having different lens structures into the camera. As a result, common moldings can be used for lens frames 5 and 6, interchangeability is increased and costs are reduced.

Lens compartments 17 and 18 are inserted and fixed in lens frames 5 and 6 by threaded insertion. Therefore, fixing, centering and other operations for position setting can be performed easily at the time of assembly. In particular, because position setting is performed by threaded insertion, there are no local stresses. Moreover, variations in the accuracy of centering and positioning is minimal and, as a result, accuracy of centering and positioning is ensured. Moreover, in portions fixed by threaded insertion, appropriate locking mechanisms can be used. Such locking mechanisms include the application of adhesive to the screw surfaces. The respective directions of insertion (see arrows B and A in FIG. 2) of lens compartments 17 and 18 are inserted in direction indicated by arrows B and A, respectively, from an outside direction to reciprocate on the optical axis. Thus, as illustrated in FIG. 2, the lens barrel has a first opening 100 and a second opening 102. Optical axis I extends through first opening 100 and second opening 102.

Lens compartments 17 and 18 are inserted through first opening 100 and second opening 102, respectively, to reciprocate lens compartments 17 and 18 into the lens barrel along optical axis L. As a result, there is excellent operability of construction and it is relatively easy to disassemble the camera.

Vibration preventing lens 8 and lens compartment 18 are independent of each other, that is, they are not integrally formed. Vibration preventing lens 8 is held by rear lens compartment 18, and rear lens compartment 18 is held by lens frame 6 so that vibration preventing lens 8 is movably supported and able to be shifted with respect to baseplate 21 by drive unit 20. Thus, vibration preventing lens 8 is independent from, and separately moveable from, other lens systems in the camera. As a result, driveability of vibration preventing lens 8 is excellent and construction is simple and accurate. The construction of drive unit 20 may be difficult from structural aspects; however, the unit separation structure allows for a simplified operation and increased accuracy.

Drive units 30 and 31 cause vibration preventing lens 8 to move in an X axis direction and a Y axis direction, respectively, and are fixed adjacent to baseplate 21. Rotation is transmitted from drive units 30 and 31 to first and second shafts 34 and 35. First shaft 34 is rotatably supported to extend in the X direction in bearing portions 21b and 21c arranged in baseplate 21. Second shaft 35 is rotatably supported to extend in the Y direction in bearing portions 21d and 21e arranged in baseplate 21. Movable members 36 and 37 comprise X axis and Y axis transmission mechanisms, respectively. A cover member 22 encloses camera components.

Guide members 55 and 56 are fixed in movable members 36 and 37. Guide members 55 and 56 are guided by guide shafts 57 and 58 which are arranged parallel to the shafts 34 and 35 in bearings 21b and 21d, or 21c and 21e, of the baseplate 21. Accordingly, movable members 36 and 37 are movable, respectively in the X axis direction and the Y axis direction, by drive units 30 and 31. Springs 53 and 54 are connected to lens frame 6.

As illustrated in FIG. 3, a drive unit 30 comprises a DC motor Mx for driving in the X axis direction and a drive unit 31 comprises a DC motor My for driving in the Y axis direction. Drive units 30 and 31 cause vibration preventing lens 8 to move in the X axis direction and the Y axis direction, respectively, and are fixed adjacent to baseplate 21. Reduction gear trains 32 and 33 operate as rotation transmission and respectively comprise gears 32a, 32b, 32c, 32d, and 33a, 33b, 33c and 33d, to transmit drive forces from motors Mx and My. Rotation is transmitted from motors Mx and My to first and second shafts 34 and 35. First shaft 34 is rotatably supported to extend in the X direction in bearing portions 21b and 21c arranged in baseplate 21. Second shaft 35 is rotatably supported to extend in the Y direction in bearing portions 21d and 21e arranged in baseplate 21. Drive units 30 and 31 are fixed on baseplate 21. Gear train 32, comprising gears 32b and 32c, and gear train 33, comprising gears 33b and 33c, are fixed and rotatably supported on baseplate 21. Gears 32d and 33d are rotatably constructed to be integral with shafts 34 and 35, respectively.

Movable members 36 and 37 comprise X axis and Y axis transmission mechanisms, respectively. Female screw portions 36a and 37a are in threaded engagement with male screw portions 34a and 35a, respectively, to form movement amount generation units which cause movement of lens frame 6 in the X axis and Y axis directions via movable members 36 and 37. Guide members 55 and 56 (see FIG. 2) are fixed in each of these movable members 36 and 37, adjacent to female screws 36a and 37a. Guide shaft guide members 55 and 56 are guided by guide shafts 57 and 58 (see FIG. 2) which are arranged parallel to the shafts 34 and 35 in bearings 21b and 21d, or 21c and 21e, of the baseplate 21. Accordingly, movable members 36 and 37 are movable, respectively in the X axis direction and the Y axis direction, by drive units 30 and 31.

As illustrated in FIGS. 3, 4A, 4B, 4C, 4D and 4E, rollers 59, 60, 61 and 62 rotate freely and are mounted on flange portion 6a of lens frame 6 by roller shafts 63, 64, 65 and 66. Springs 53 and 54 pass across between a spring peg portion 6b on the opposite side of rollers 59 and 60 of lens frame 6, a spring peg portion 6c of the opposite side of rollers 61 and 62, and baseplate 21, approximately in the same direction as the X axis direction and Y axis direction of movable members 36 and 37. Rollers 59 and 60 are urged by spring 53 to contact with L-shaped contact members 36c and 36b in the ends of movable element 36. Rollers 61 and 62 are urged by spring 54 to contact with L-shaped contact members 37c and 37b in the ends of movable element 37. Therefore, vibration preventing lens 8 shifts to follow the X axis movement of movable member 36 due to the X axis drive unit 30, but becomes free in the Y direction. Similarly, vibration preventing lens 8 shifts to follow the Y axis movement of the movable member 37 due to the Y axis drive unit 31, but becomes free in the X direction. As a result, vibration preventing lens 8 can shift in all directions within aperture 21a of baseplate 21. Moreover, by the urging of lens frame 6 by springs 53 and 54 in approximately the same direction as the X axis direction and Y axis direction, which are the movement directions of the movable members 36 and 37, lens frame 6 and movable members 36 and 37 are usually in a state of contact. In this manner, the movement of movable members 36 and 37 can be reliably transmitted to lens frame 6.

By the urging of spring 53, play in the thrust direction of shaft 34 and play in the thread connected portions of female screw portion 36a of movable member 36 and male screw portions 34a of shaft 34 can be reduced in the respective urging direction. Similarly, by the urging of spring 54, play in the thrust direction of shaft 35 and play in the thread connected portions of female screw portion 37a of movable member 37 and male screw portions 35a of shaft 35 can be reduced in the respective urging direction. Accordingly, the drive force of the respective drive units 30 and 31 can be transmitted correctly and reliably to vibration preventing lens 8.

As illustrated in FIG. 3, perforated disks 40x and 40y are arranged integrally with gears 32a and 33a, respectively. Rim portions of perforated disks 40x and 40y have numerous holes arranged at equal intervals. Photointerruptors 41x and 41y are arranged beside baseplate 21 and inserted between the rim portions of perforated disks 41x and 40y. Photointerruptors 41x and 41y detect the number of adjacent holes of perforated disks 40x and 40y as pulse signals. Thus pulse signals are counted, the movement of drive units 30 and 31, and the position and speed of vibration preventing lens 8 are thus detected. With the above-described drive unit 20, vibration preventing lens 8 of second lens group 9 shifts in a direction which is at right angles with respect to the optical axis L. As a result, the image imaged on the imaging plane 16 moves in the required direction and image vibration is prevented. Furthermore, drive unit 20 is constructed as a unit in an annular space formed on the external circumferential side of lens frame 6 of vibration preventing lens 8, using a case member comprising baseplate 21 and cover member 22. The size of drive unit 20 is made small. Complicated mechanisms, such as lens shutter 12, can be located in adjacent locations. Arm portions 6f and 6g are disposed on a portion of lens frame 6 (see also FIG. 6A).

FIG. 4A is a cross section of an optical system along the line IV—IV of FIG. 3, according to an embodiment of the present invention. FIGS. 4B, 4C, 4D and 4E are diagrams illustrating portions of the optical system illustrated in FIG. 4A, according to an embodiment of the present invention. More specifically, circle 200a in FIG. 4B, circle 200b in FIG. 4C, circle 200c in FIG. 4D and circle 200d in FIG. 4E illustrate enlarged views of respective interconnection regions of the optical system.

FIG. 5A is a cross section of an optical system along the line V—V of FIG. 3, according to an embodiment of the present invention. FIG. 5A in particular illustrates springs 51 and 52 and a sliding member 50 fixed around aperture portion 21a of the inner portion of baseplate 21. FIGS. 5B, 5C, 5D and 5E illustrate portions of the optical system illustrated in FIG. 5A, according to an embodiment of the present invention. More specifically, circle 300a in FIG. 5B, circle 300b in FIG. 5C, circle 300c in FIG. 5D and circle 300d in FIG. 5E illustrate enlarged views of respective interconnection regions of the optical system.

FIG. 6A is a diagram illustrating a jig for use at the time of insertion of the optical system in FIG. 5A, according to an embodiment of the present invention. FIGS. 6B, 6C, 6D and 6E are diagrams illustrating portions of the optical system as illustrated in FIG. 6A. More specifically, circle 400a in FIG. 6B, circle 400b in FIG. 6C, circle 400c in FIG. 6D and circle 400d in FIG. 6E illustrate enlarged views of respective interconnection regions of the optical system. As illustrated in FIG. 6A, spring 51 passes across lens frame 6 and extends between arm portion 6f and baseplate 21. Spring 52 passes across lens frame 6 and extends between arm portion 6g and baseplate 21. Flange portion 6a is disposed on an external circumferential portion of lens frame 6 and is usually in contact with sliding member 50. Sliding member 50 is fixed around aperture portion 21a of the inner portion of baseplate 21. Sliding member 50 comprises a material having low friction properties. For example, sliding member 50 comprises fluororesin, phosphor bronze, or a material which has been surface treated so as to have low friction properties. In this manner, vibration preventing lens 8 is movable by low loads in the X axis and Y axis directions in a plane at right angles to the optical axis I. Furthermore, vibration preventing lens 8 is urged by springs 51 and 52 so that optical performance is not impaired by a "tilt" between the optical axis of vibration preventing lens 9 and the optical axis I of photographic lens system 2. A jig 71 has protruding portions 71a, 71b, 71c and 71d to insert and fix lens compartment 18 in lens frame 6.

Figure 7:
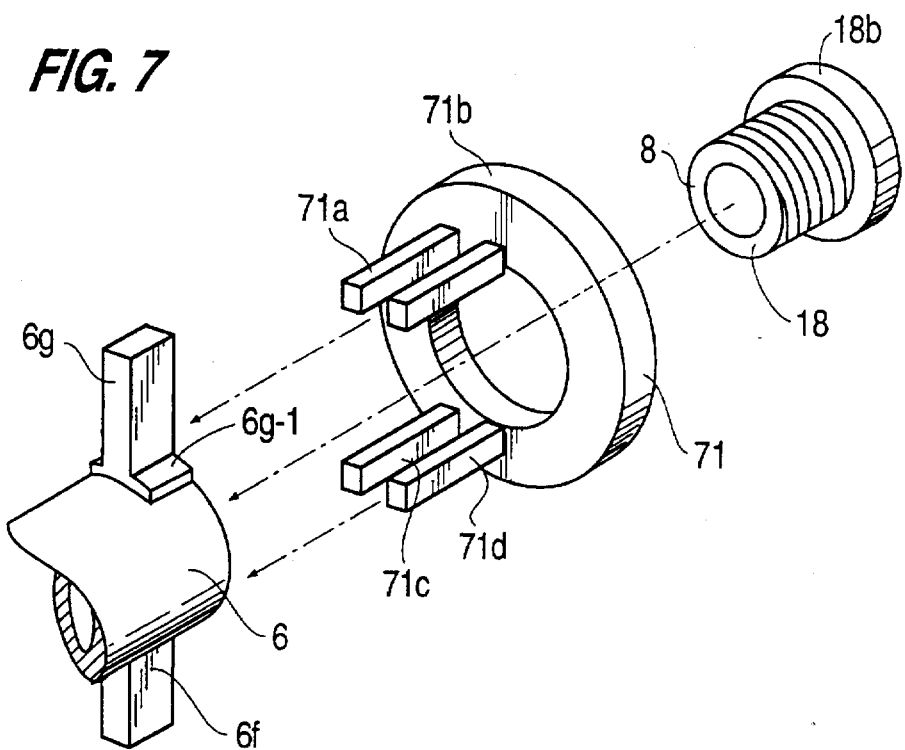
FIG. 7 is a diagram illustrating the jig shown in FIG. 6A, according to an embodiment of the present invention.
Figure 8:
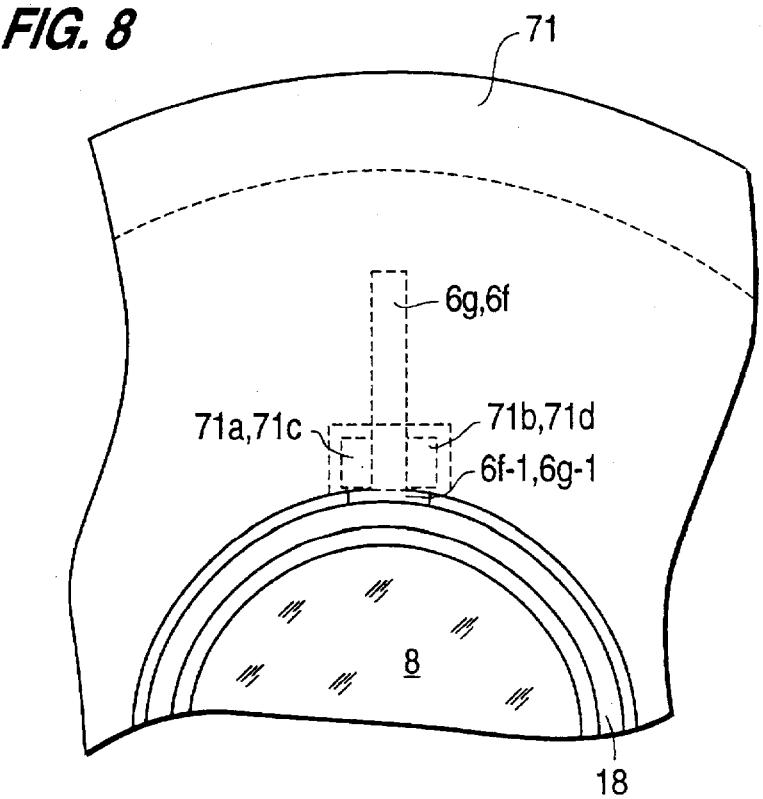
FIG. 8 is a diagram illustrating the operation of the jig shown in FIG. 6A, as seen from the direction of the arrow VIII in FIG. 6A, according to an embodiment of the present invention.

FIG. 7 is a diagram illustrating the jig shown in FIG. 6A, according to an embodiment of the present invention, and FIG. 8 is a diagram illustrating the operation of the jig shown in FIG. 6A, as seen from the direction of the arrow VIII in FIG. 6A, according to an embodiment of the present invention. FIGS. 6A, 6B, 6C, 6D, 6E, 7 and 8, taken together, illustrate a method of inserting and fixing lens compartment 18 in lens frame 6 of vibration preventing lens 8.

As shown in FIGS. 6A, 6B, 6C, 6D and 6E, flange portion 6a of lens frame 6 contacts with sliding member 50 fixed on baseplate 21 at the time of mounting to receive a force in the direction of arrow A. Moreover, as shown in FIGS. 7 and 8, jig 71 has protruding portions 71a, 71b, 71c and 71d to insert and fix lens compartment 18 in lens frame 6. Protruding portions 71c and 71d of jig 71 are brought into contact with arm 6f of lens frame 6. Arm 6f is used as a spring peg sandwiched between protruding portions 71c and 71d. Protruding portions 71a and 71b are brought into contact with arm 6g of lens frame 6. Arm 6g is sandwiched between protruding portions 71a and 71b and stops rotation of lens frame 6. As illustrated in FIG. 8, arm 6f is formed with a portion 6f-1 which contacts protruding portions 71c and 71d, and a portion 6g-1 in arm 6g which contacts protruding portions 71a and 71b. Arm 6f is then able to perform position setting of lens frame 6 in a radial direction. This kind of rotation arrest is clearly advantageous to place vibration preventing lens 8 in a movable shift state, because it is necessary in the case of lens frame 6 being movably disposed, floatingly supported on the baseplate 21 side. Thus, jig 71 is used as a cooperating part for use in arresting at the time of insertion by threaded insertion of lens compartment 18. Moreover, arm portions 6f and 6g are used as spring pegs and arranged to protrude on one side of drive unit 20. Therefore, it is not necessary to dispose special cooperating portions for jig arresting use, the processability and cost aspects are excellent, and manufacturing is relatively easy. Other suitable cooperating portions may be utilized as jig arrests. For example, a portion of the external circumference of lens frame 5 can be directly retained at the time of insertion of lens compartment 17.

Figure 9:
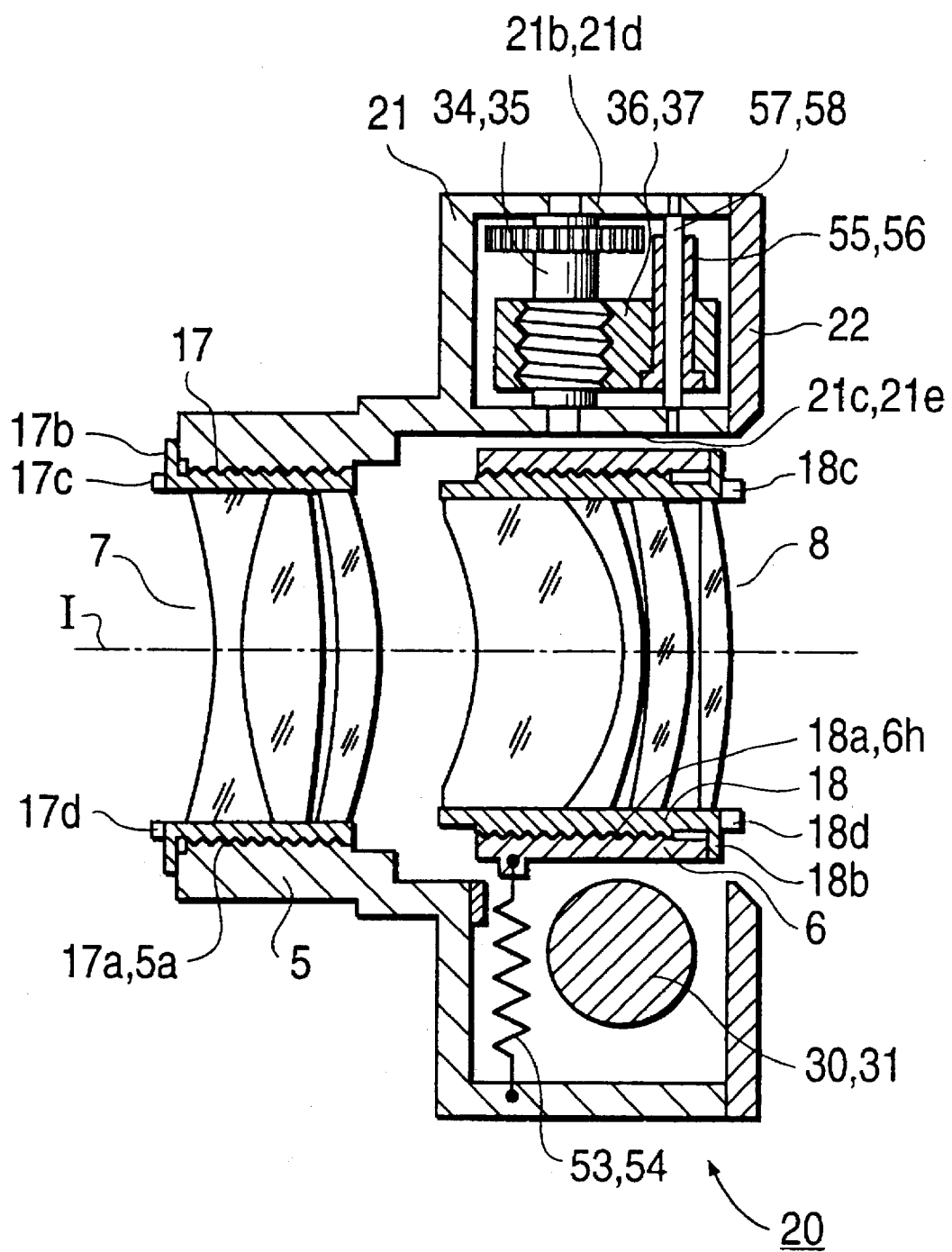
FIG. 9 is a sectional diagram showing a lens barrel of a camera, according to an embodiment of the present invention.

FIG. 9 is a sectional diagram showing a separate a lens barrel of a camera, according to an embodiment of the present invention. FIG. 9 illustrates an interchangeable lens barrel used in a single lens reflex camera. Lens compartment 17 of front lens group 7 in second lens group 9 is integrally formed in baseplate 21. Baseplate 21 is a base member which supports lens compartment 18 holding vibration preventing lens 8. A portion of baseplate 21 is a cover member 22. Furthermore, a lens can be mounted adjacent to, and rearward of, vibration preventing lens 8 by mounting the adjacent lens in lens compartment 17 and fixing lens compartment 17 in a respective lens frame which is directly or integrally disposed in cover member 22. Baseplate 21 is a base member to retain the front lens group 7 of second lens group 9, an electric motor (for example, a DC motor, a supersonic wave motor, or other type of motor for use in autofocusing), an electric motor step mechanism, a drive unit of an electric motor lens barrier mechanism and a drive unit of an electric motor zoom mechanism. Lens compartments 17 and 18, which retain front lens group 7 and rear lens group 8, respectively, are independent, separate members with respect to lens frames 5 and 6. Insertion of lens systems into lens frame 5 and 6 may be performed after a drive unit for driving a vibration preventing lens is installed on baseplate 21.

The present invention is not intended to be limited to the above described structures. The structure of each part may be suitably modified or altered. For example, in a camera according to the above-described embodiments of the present invention, lens compartments 18 and 17 retain vibration preventing lens 8 and lens group 7 on the forward side (towards the photographic subject) of the camera and are inserted and fixed by threaded insertion into lens frames 6 and 5. However, various other types of fittings and insertions can be used. For example, bayonet, snap fitting, and similar connection methods can be used. Also, press-in, adhesion and similar insertion and fixing methods can be used.

Furthermore, in a camera according to the above-described embodiments of the present invention, each lens compartment 17 and 18 is inserted and fixed on the optical axis from two separate outside directions (see arrows A and B in FIG. 6A). However, insertion of both lens compartment members 17 and 18 can be from one side or from the same direction. In this manner, radially large and small lenses can be inserted in an appropriate direction in accordance with the radial dimension of the respective lens.

In a camera according to the above-described embodiments of the present invention, a lens barrel equipped with a drive unit 20 is applied to portions which retain front lens group 7 and rear lens group 8 of second lens group 9. However, the camera can also comprise lens frames 5 and 6 having respective, corresponding lens systems inserted therein. Suitable drive units can be used to respectively drive lens frames 5 and 6. The camera can have various other lens systems in addition to vibration preventing lens 8.

FIG. 10A is a sectional diagram showing a lens barrel of a camera, according to an embodiment of the present invention. FIG. 10B is a diagram illustrating a portion of the lens barrel illustrated in FIG. 10A, according to an embodiment of the present invention. More specifically, circle 500a in FIG. 10B illustrates an enlarged view of a respective interconnection region of the optical system. In FIG. 10A, front lens group 7 in the second lens group 9 is used as a focusing lens. Front lens group 7 is used to focus the camera by moving in the direction of the optical axis I, as shown by arrow C in FIG. 10A. A lens compartment 117 retains front lens group 7. Lens compartment 117 is screwably connected to lens frame 5 by helicoids 117a and 5b. Via the connection of helicoids 117a and 5b, lens compartment 117 is moved back and forth in the optical axis direction with respect to lens frame 5 by rotating and moving lens compartment 117 around the optical axis I. An autofocus mechanism 115 drives front lens group 7 to focus the camara. According to conventional methods, a focusing lever 115a causes front lens group 7 to rotate around the optical axis I. Lens compartment 117 is connected to a bifurcated arm portion 117b of focusing lever 115a so that lens compartment 117 rotates. Accordingly, as illustrated by arrow D, lens compartment 117 rotates around the optical axis I by focusing lever 115a and moves back and forth in the optical axis direction by autofocusing mechanism 115 via a helicoid connection so that the camera is properly focused. Lens compartment 117 is inserted into the lens barrel by threading of the screw connection of helicoids 5b and 117a to lens frame 5.

FIG. 11A is a sectional diagram showing a lens barrel of a camera, according to an embodiment of the present invention. FIG. 11B is a diagram illustrating a portion of the lens barrel illustrated in FIG. 11A, according to an embodiment of the present invention. More specifically, circle 600a in FIG. 11B illustrates an enlarged view of a respective interconnection region of the optical system. FIG. 11A is similar to FIG. 10A, but FIG. 11A illustrates a conventional stop comprising a conventional stop aperture 212 and conventional aperture stop blades 213 and 214. A conventional stop driving unit 215 drives aperture stop blades 213 and 214.

Figure 12:
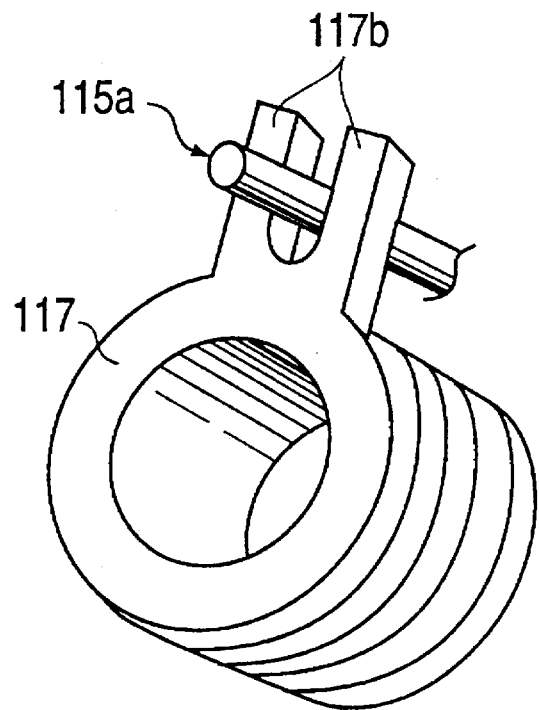
FIG. 12 is diagram illustrating a perspective view of an arm portion and a focusing lever in a camera as illustrated in FIGS. 10A and 11A, according to an embodiment of the present invention.
Figure 13:
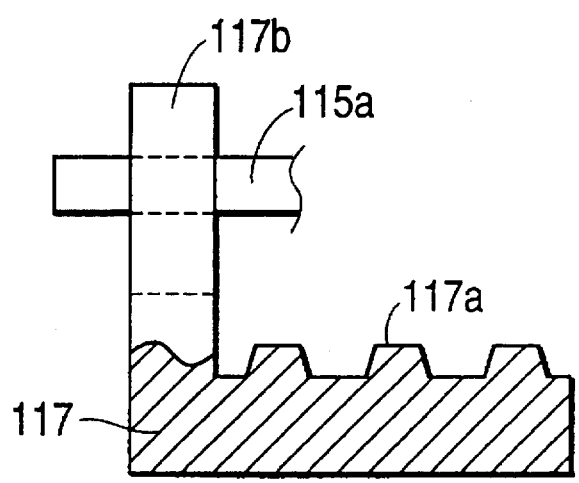
FIG. 13 is diagram illustrating a perspective view of an arm portion and a focusing lever in a camera as illustrated in FIGS. 10A and 11A, according to an embodiment of the present invention.

FIGS. 12 and 13 are diagrams illustrating perspective views of arm portion 117b and focusing lever 115a in a camera as illustrated in FIGS. 10A and 11A, according to an embodiment of the present invention.

In a camera according to the above embodiments of the present invention, the transmission of drive force of drive units 30 and 31 is via screw mechanisms applied to movable members 36 and 37. In this manner vibration preventing lens 8 is moved and shifted by drive unit 20. However, rotary motion may be converted into rectilinear motion by other mechanisms. For example, such other mechanisms can include cam mechanisms or levers.

Further, in a camera according to the above embodiments of the present invention, shutter drive unit 15 is illustrated as being adjacent to drive unit 20 and located outside lens frame 5. However, other mechanisms can be located adjacent to drive unit 20. For example, a lens shutter with a built-in focus adjustment unit, a stop unit or an autofocusing unit can be located adjacent to drive unit 20.

Moreover, a camera according to the above embodiments of the present invention can be a compact camera having a lens shutter which is of a zoom type. However, the camera is not intended to be limited to this type of camera. For example, the camera can have a lens frame integrally formed with a lens group which is adjacent to the vibration preventing lens. Moreover, the lens barrel of the camera is not limited to an interchangeable lens barrel and can be a non-interchangeable lens barrel. Further, embodiments of the present invention can be applied to devices other than cameras. For example, embodiments of the present invention can be applied to various types of optical instruments and optical devices.

A camera according to the above embodiments of the present invention is equipped with a lens barrel having first and second optical systems (for example, front lens group 7 and rear lens group 8) which are adjacently positioned in the direction of the optical axis of a main optical system. First and second lens compartments (for example, lens compartments 17 and 18) respectively retain the first and second optical systems. The first and second lens compartments are respectively inserted and retained in first and second lens frames (for example, lens frames 5 and 6). The first and second lens frames are supported on a base member (for example, baseplate 21). A drive unit moves the first and second lens systems in the optical axis direction and is attached to the base member. The first and second lens compartments are independently formed separate bodies so that they can be inserted and fixed by respective threading within the corresponding lens frame. This structure is simple and offers excellent benefits.

In a camera according to the above embodiments of the present invention, first and second lens compartments members are independent bodies from, and are not integrally formed with, lens frames. Drive units and lens frames are installed into the camera. The first and second lens compartments, retaining first and second optical systems, are installed in the camera after the installation of the drive units and the lens frames. Thus, the first and second optical systems are not soiled or damaged by the installation of the drive units and lens frames.

In a camera according to the above embodiments of the present invention, design or specification changes in the optical systems of the main optical system merely require that a respective lens compartment retaining a respective optical system be replaced. Drive units, lens frames and other components do not have to be removed or replaced. A base member or base members, drive units, lens frames are designed so that these components are operable with different types of lens systems and do not have to be replaced in order to replace a respective lens system.

Moreover, in a camera according to the above embodiments of the present invention, a lens compartment member which retains a respective optical system is inserted and fixed in a lens frame by threading. This threading is advantageous in that it allows easy inserting, fixing, positioning, centering and setting of the optical system. Moreover, the lens compartments can be inserted from an outside direction of the lens barrel along the optical axis, thereby conferring easy installation and removal of the optical systems from the lens barrel.

In a camera according to the above embodiments of the present invention, a vibration preventing optical system is independently formed from, and is not integrally formed with, a corresponding lens frame. The lens frame retains the vibration preventing optical system and a drive unit shifts the vibration preventing optical system with respect to a base member. Thus, the adjustment of the position of the vibration preventing optical system with respect to the lens frame is performed independent of the shifting of the vibration preventing optical system by the drive unit. Thus, construction is simple and shifting of the vibration preventing optical system is easily performed by the drive unit.

In a camera according to above embodiments of the present invention, a second lens compartment retains a second optical system and a second lens frame holds the second lens compartment. The second optical system is adjacent to a vibration preventing optical system. The second lens frame can be integral with, or fixed to, a base member. Space inside the camera can be minimized by properly positioning and assembling a lens shutter mechanism, a stop mechanism, an autofocusing mechanism and/or other components inside the lens barrel. The lens shutter mechanism, stop mechanism or autofocus mechanism can be supported on a base member.

In a camera according to above embodiments of the present invention, a jig is used as an arrest when a lens system is inserted into the lens barrel by screwing the lens compartment into a lens frame. Thus, the insertion of the lens system is simply performed.

In a camera according to above embodiments of the present invention, a lens frame and a corresponding drive unit for driving the lens frame are installed on a base member. After the installation of the lens frame and the drive unit, a lens compartment retaining an optical system is inserted into the lens frame.

The above embodiments of the present invention are described as relating to a "lens barrel". However, the present invention is not intended to be limited to a lens barrel. For example, the present invention can be applied to virtually any type of lens apparatus. A lens apparatus can be, for example, a lens barrel, a camera, other various other types of optical devices.

The above embodiments of the present invention describe various lens groups, such as front lens group 7 and rear lens group 8. Each of these lens groups represents a respective, convention optical system which is a part of a conventional, overall photographic optical system.

Although a few preferred embodiments of the invention have been shown and described, it will be appreciated by those skilled in the art that changes may be made in these embodiments, without departing from the principles and the spirit of the invention, the scope of which is defined in the claims and their equivalents.

What is claimed is:

1. A lens apparatus comprising:
   first and second optical systems, an optical axis of the lens apparatus extending thorough the first and second optical systems;
   first and second lens compartments which respectively retain the first and second optical systems;
   first and second lens frames which respectively correspond to, and respectively retain, the first and second lens compartments, the first and second lens compartments being independent structures from the first and second lens frames to allow the first and second lens compartments to be removed from, and inserted into, the respectively corresponding first and second lens frames;
   a drive unit which drives at least one of the first and second optical systems to change the positioning of the driven optical system along the optical axis; and
   a base member which supports the first and second lens frames and the drive unit, wherein the drive unit is positioned to allow the first and second lens compartments, respectively retaining the first and second optical systems, to be inserted into the corresponding first and second lens frames after the drive unit is positioned and supported on the base member.

2. A lens apparatus as in claim 1, wherein the first and second lens compartments are retained by the first and second lens frames via threading.

3. A lens apparatus comprising:
   first and second optical systems, an optical axis of the lens apparatus extending thorough the first and second optical systems;
   first and second lens compartments which respectively retain the first and second optical systems; and
   first and second lens frames which respectively correspond to, and respectively retain, the first and second lens compartments, the first and second lens compartments being independent structures from the first and second lens frames to allow the first and second lens compartments to be removed from, and inserted into, the respectively corresponding first and second lens frames,
   wherein at least one of the first and second lens frames has cooperating portions and the lens apparatus further comprises a jig which cooperates with the cooperating portions of the at least one of the first and second lens frames to position and retain the at least one of the first and second lens frames inside the lens apparatus.

4. A lens apparatus comprising:
   first and second optical systems, an optical axis of the lens apparatus extending thorough the first and second optical systems;
   first and second lens compartments which respectively retain the first and second optical systems; and
   first and second lens frames which respectively correspond to, and respectively retain, the first and second lens compartments, the first and second lens compartments being independent structures from the first and second lens frames to allow the first and second lens compartments to be removed from, and inserted into, the respectively corresponding first and second lens frames,
   wherein the first optical system is a vibration preventing optical system which is moved to compensate for vibrations affecting the lens apparatus, the first optical system and the second optical system being positioned adjacent to each other along the optical axis, the lens apparatus further comprising
      a drive unit which moves the first lens frame to thereby move the vibration preventing optical system, and
      a base member, the drive unit and the second lens frame being fixed to the base member.

5. A lens apparatus as in claim 4, further comprising a shutter drive unit for driving a shutter, the shutter drive unit being fixed to the second lens frame.

6. A lens apparatus as in claim 5, further comprising a stop driving unit which is fixed to the second lens frame.

7. A lens apparatus comprising:
first and second optical systems, an optical axis of the lens apparatus extending thorough the first and second optical systems;
first and second lens compartments which respectively retain the first and second optical systems;
first and second lens frames which respectively correspond to, and respectively retain, the first and second lens compartments, the first and second lens compartments being independent structures from the first and second lens frames to allow the first and second lens compartments to be removed from, and inserted into, the respectively corresponding first and second lens frames;
a drive unit which moves the first lens frame;
a base member which supports the drive unit and the second lens frame;
a shutter which divides the base member into a first side and a second side, the drive unit being supported on the first side of the base member; and
a shutter drive unit for driving the shutter, the shutter drive unit being supported on the second side of the base member.

8. A lens apparatus comprising:
first and second optical systems, an optical axis of the lens apparatus extending thorough the first and second optical systems;
first and second lens compartments which respectively retain the first and second optical systems;
first and second lens frames which respectively correspond to, and respectively retain, the first and second lens compartments, the first and second lens compartments being independent structures from the first and second lens frames to allow the first and second lens compartments to be removed from, and inserted into, the respectively corresponding first and second lens frames;
a drive unit which moves the first lens frame;
a base member which supports the drive unit and the second lens frame;
a shutter which divides the base member into a first side and a second side, the drive unit being supported on the first side of the base member; and
a stop driving unit which is supported on the second side of the base member.

9. A method of assembling a lens apparatus, the lens apparatus including first and second optical systems, first and second lens compartments which respectively retain the first and second optical systems, first and second lens frames which respectively correspond to, and respectively retain, the first and second lens compartments, a drive unit which moves at least one of the first and second optical systems to change the position of the at least one first and second optical systems, and a base member, the method comprising:
fixing the drive unit to the base member;
fixing the first and second lens frames to the base member; and
respectively fixing the first and second lens compartments, respectively retaining the first and second optical systems, into the first and second lens frames after the drive unit and the first and second lens frames are fixed to the base member, wherein the lens apparatus has a first opening and a second opening, an optical axis extending through the first and second opening, and the step of respectively fixing the first and second lens compartments further comprises
inserting the first and second lens compartments respectively through the first and second openings to reciprocate the first and second lens compartments into the lens apparatus along the optical axis.

10. A method as in claim 9, wherein the step of respectively fixing the first and second lens compartments further comprises:
positioning the first and second lens compartments so that the optical axis extends from the first opening of the lens apparatus, through the first and second optical systems, to the second opening of the lens apparatus.

11. A method as in claim 9, wherein at least one of the first and second lens frames has cooperating portions and a jig cooperates with the cooperating portions of the at least one of the first and second lens frames, and the step of respectively fixing the first and second lens compartments further comprises:
using the jig to position and retain the at least one of the first and second lens frames inside the lens apparatus.

12. A method as in claim 9, wherein the step of respectively fixing the first and second lens compartments further comprises:
fixing the first and second lens compartments to the first and second lens frames by threaded insertion.

13. A method of assembling a lens apparatus, the lens apparatus including first and second optical systems, first and second lens compartments which respectively retain the first and second optical systems, first and second lens frames which respectively correspond to, and respectively retain, the first and second lens compartments, a drive unit which moves at least one of the first and second optical systems to change the position of the at least one first and second optical systems, and a base member, the method comprising:
fixing the drive unit to the base member;
fixing the first and second lens frames to the base member; and
respectively fixing the first and second lens compartments, respectively retaining the first and second optical systems, into the first and second lens frames after the drive unit and the first and second lens frames are fixed to the base member,
wherein at least one of the first and second lens frames has cooperating portions and a jig cooperates with the cooperating portions of the at least one of the first and second lens frames, and the step of respectively fixing the first and second lens compartments further comprises
using the jig to position and retain the at least one of the first and second lens frames inside the lens apparatus.

14. A method of assembling a lens apparatus, the lens apparatus including first and second optical systems, first and second lens compartments which respectively retain the first and second optical systems, first and second lens frames which respectively correspond to, and respectively retain, the first and second lens compartments, a drive unit which moves at least one of the first and second optical systems to change the position of the at least one first and second optical systems, and a base member, the method comprising:
fixing the drive unit to the base member;
fixing the first and second lens frames to the base member; and respectively fixing the first and second lens compartments, respectively retaining the first and second optical systems, into the first and second lens frames after the drive unit and the first and second lens frames are fixed to the base member, wherein the first optical system is a vibration preventing lens and the drive unit moves the vibration preventing lens to compensate for vibrations affecting the lens apparatus.

* * * * *

UNITED STATES PATENT AND TRADEMARK OFFICE
CERTIFICATE OF CORRECTION

PATENT NO. : 5,675,445

DATED : October 7, 1997

INVENTOR(S) : Yukio UEMURA, et al.

It is certified that error appears in the above-identified patent and that said Letters Patent is hereby corrected as shown below:

Col. 15, line 1 (claim 6), delete "5" and insert --4--.

Signed and Sealed this

Twenty-fourth Day of March, 1998

*Attest:*

BRUCE LEHMAN

*Attesting Officer*     *Commissioner of Patents and Trademarks*